United States Patent [19]

Paulson et al.

[11] 3,991,873

[45] Nov. 16, 1976

[54] ATTACHING PRINT DISC TO DRIVE IN IMPACT PRINTERS

[75] Inventors: Gary R. Paulson, Loveland, Colo.; Ralph L. Tenbrink, Boise, Idaho

[73] Assignee: Hewlett-Packard Company, Palo Alto, Calif.

[22] Filed: June 11, 1975

[21] Appl. No.: 586,109

[52] U.S. Cl. ................................ 197/53; 101/93.19; 403/189

[51] Int. Cl.$^2$ ......................... B41J 1/30; F16B 7/08

[58] Field of Search .................. 197/6.7, 18, 48, 49, 197/53–55; 101/93.19; 403/189, 331, 381

[56] References Cited

UNITED STATES PATENTS

| | | | |
|---|---|---|---|
| 752,792 | 2/1904 | Moya | 197/54 |
| 959,854 | 5/1910 | Grierson | 403/381 X |
| 1,430,908 | 10/1922 | Kennedy | 403/381 X |
| 3,366,357 | 1/1968 | Rudow et al. | 403/331 X |
| 3,425,428 | 2/1969 | Schwartz | 403/331 X |
| 3,504,877 | 4/1970 | Lyon | 403/189 X |
| 3,651,916 | 3/1972 | Becchi | 197/54 |
| 3,878,929 | 4/1975 | Orlens et al. | 197/18 X |
| 3,907,091 | 9/1975 | Meier et al. | 197/53 |

FOREIGN PATENTS OR APPLICATIONS

| | | | |
|---|---|---|---|
| 80,680 | 4/1963 | France | 403/381 |

*Primary Examiner*—Edgar S. Burr
*Assistant Examiner*—Paul T. Sewell
*Attorney, Agent, or Firm*—Ronald E. Grubman

[57] ABSTRACT

A print disc and guide are configured so that the print disc can be mounted on a driving shaft transversely to the shaft axis. Removal and replacement of the print disc are thereby facilitated.

2 Claims, 2 Drawing Figures

ATTACHING PRINT DISC TO DRIVE IN IMPACT PRINTERS

BACKGROUND AND SUMMARY OF THE INVENTION

In serial printers, there is typically utilized a circular print disc positioned parallel to the plane of a surface to be printed, and containing a character font disposed at angular increments around the face of the disc. To print any desired character, the print disc is rotated by a driving mechanism to an angular position corresponding to that character. The character is then hammered into contact with an inked ribbon and the surface to be printed.

Largely because of space constraints, it has been a problem in known printers to remove and/or replace the print disc. In the prior art, removal is typically effected by rotating the entire driving mechanism away from the printing surface in order to allow the print disc to be slipped off a supporting shaft. This is an extremely cumbersome procedure requiring bearings, hinges, and other mechanical elements, all of which must be kept in alignment for proper operation of the printer.

In accordance with the illustrated preferred embodiments, the present invention provides a print disc which can be removed from and replaced on a supporting rotatable member in a direction transverse to the rotation axis of the rotatable member. The print disc may therefore be slipped into and out of position between the driving mechanism and the printing surface without rotation of the drive or any other major disturbance of the apparatus. To achieve this result, a guide is provided which is affixed to the end of a drive shaft. The print disc may then be slipped onto the guide in a direction perpendicular to the shaft axis. Preferably, the guide includes tensioning elements to retain the print disc in position.

DETAILED DESCRIPTION OF THE INVENTION

Figure 1:
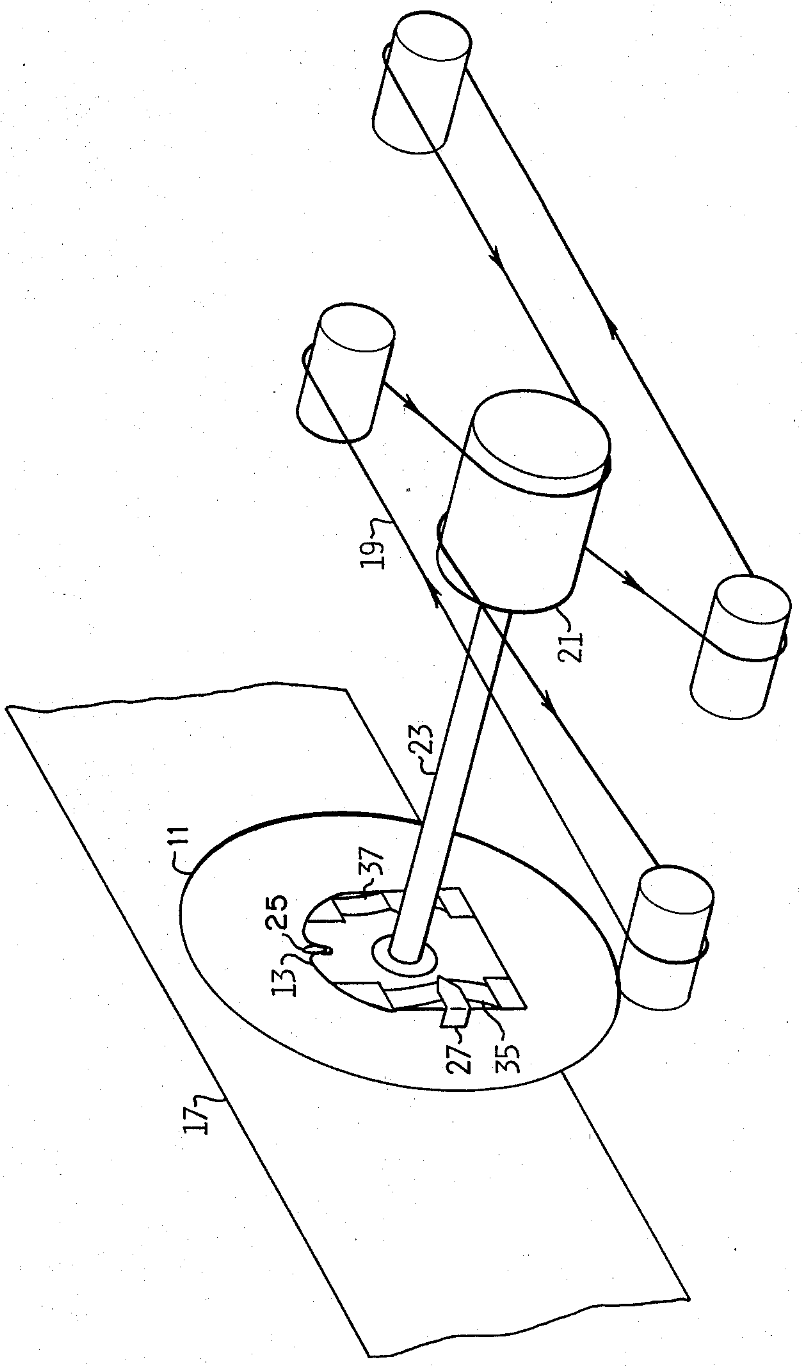
FIG. 1 shows a portion of a printer according to the invention.
Figure 2:
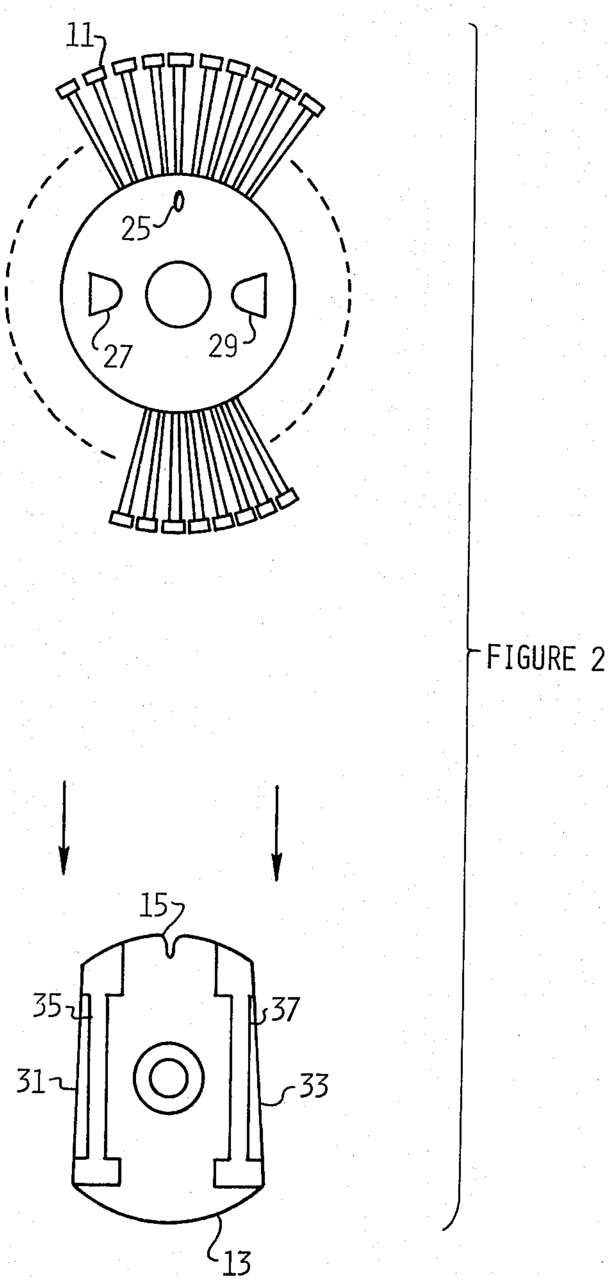
FIG. 2 illustrates a print disc and a guide according to the invention.

In FIGS. 1 and 2, there is illustrated a print disc 11 having a character font distributed around its circumference, as is known in the art. Typically such print discs are molded from plastic. To print any particular character in the font, the disc is rotated into the correct angular position so that the desired character is presented to the surface to be printed. This surface labeled 17 in FIG. 1 typically comprises a portion of a paper sheet maintained by pressure around a roller or the like. Rotation and translation of the print disc may be accomplished in a number of ways known in the art. For example, in FIG. 1 there is shown a differential drive mechanism including a continuous belt 19 in contact with a cylinder 21. The belt may be differentially driven by a pair of motors (not shown) in a manner disclosed in copending U.S. Pat. application Ser. No. 511,339, filed Oct. 2, 1974, by Gary R. Palson, now U.S. Pat. No. 3,926,061. Responsive to the differential drive, print disc 11 will be translated and rotated so as to always present the desired character to the surface to be printed. Other driving mechanisms are also suitable, e.g., the print disc may be rotated by a motor positioned behind the disc, while the entire assembly is translated on a track running parallel to the printing surface.

In the illustrated embodiment, a rotatable member in the form of a shaft 23 extends from cylinder 21 and transmits rotational and translational motion to print disc 11. The disc must therefore be securely affixed to shaft 23. However, to facilitate replacement, it is also required that print disc 11 be easily removable from shaft 23. Since print disc 11 must be positioned very close to paper surface 17, removal of the disc from the end of shaft 23 axis has been a difficulty in the art, often requiring the use of complicated schemes for rotating the entire driving mechanism away from the print surface whenever the print disc is to be removed.

In accordance with the invention, print disc 11 is inserted onto and removed from shaft 23 in a direction substantially perpendicular to the shaft axis. To facilitate insertion and removal of the disc, and to maintain its proper positioning, it is preferable to provide a guide mechanism for conjoining disc 11 to shaft 23. Different guides may be employed; for example, shaft 23 may itself be fabricated to include an integral extended portion for guiding print disc 11 onto the shaft. In FIGS. 1 and 2, a separate guide element 13 is shown which is positioned on shaft 23. The guide may be pressfit onto the shaft or locked on by means of a key or a retaining ring, or otherwise held on the shaft. Once guide 13 has been positioned on the shaft, disc 11 may be engaged by sliding disc 11 onto guide 13 in a direction perpendicular to the shaft axis as indicated by the arrows in FIG. 2. The print disc may therefore be easily inserted into the limited space available in the printer housing. To maintain desired accuracy of printing, it is important that the position of the disc with respect to the shaft be precisely controlled. This may be variously accomplished by constructing the guide in any number of suitable configurations which will be apparent to those skilled in the art. In a preferred embodiment, guide 13 includes a slot 15 into which fits a protruding element 25 of disc 11. In this preferred embodiment, disc 11 itself includes extended portions 27 and 29 which contact the left and right edges 31 and 33 of guide 13 when the disc is slipped onto the guide. This construction insures that the print disc 11 will be accurately positioned with respect to the guide 13 and hence also with respect to driving shaft 23. In some preferred embodiments, guide 13 also includes a pair of flat springs 35 and 37 which exert pressure against extended portions 27 and 29 of disc 11 when the disc is snapped into position. Thus, once in position, the print disc is held rigidly and accurately with respect to the shaft but may simply be removed by manual exertion of sufficient pressure transverse to the shaft axis to release the force of springs 35 and 37.

We claim:

1. In an impact printer, a printing mechanism comprising:

drive means including a rotatable member;

guide means mounted on one end of said rotatable member for providing a guiding surface substantially perpendicular to the axis of said rotatable member;

tensioning means on said guide means for providing a locking force; and a print disc removably mounted on said guide means for engagement with said tensioning means to provide insertion onto and removal from said rotatable member in a direction substantially perpendicular to the axis of said rotatable member.

2. In an impact printer, a mechanism as in claim 1 wherein:

said tensioning means comprises a pair of flat springs exerting pressure against extended portions of said print disc to removably maintain said disc in position with respect to said rotatable member.

* * * * *